United States Patent
May et al.

(10) Patent No.: US 12,248,299 B2
(45) Date of Patent: Mar. 11, 2025

(54) CONTROL SYSTEM UNIT FOR USE IN A 3-DIMENSIONAL OBJECT MANUFACTURING SYSTEM AND A CORRESPONDING METHOD OF OPERATING

(71) Applicant: AM-Flow Holding B.V., Amsterdam (NL)

(72) Inventors: Gideon May, Amsterdam (NL); Reinder Alexander Lambertus Koelstra, Amsterdam (NL); Yueting Liu, Amsterdam (NL); Jonathan Van Der Spek, Amsterdam (NL)

(73) Assignee: AM-FLOW HOLDING B.V., Amsterdam (NL)

( * ) Notice: Subject to any disclaimer, the term of this patent is extended or adjusted under 35 U.S.C. 154(b) by 510 days.

(21) Appl. No.: 17/628,109

(22) PCT Filed: Jul. 16, 2020

(86) PCT No.: PCT/NL2020/050467
§ 371 (c)(1),
(2) Date: Jan. 18, 2022

(87) PCT Pub. No.: WO2021/010833
PCT Pub. Date: Jan. 21, 2021

(65) Prior Publication Data
US 2022/0260968 A1   Aug. 18, 2022

(30) Foreign Application Priority Data
Jul. 17, 2019   (EP) .................................... 19186835

(51) Int. Cl.
*G05B 19/4099*   (2006.01)

(52) U.S. Cl.
CPC ................. *G05B 19/4099* (2013.01); *G05B 2219/49023* (2013.01)

(58) Field of Classification Search
None
See application file for complete search history.

(56) References Cited

U.S. PATENT DOCUMENTS

| | | | | |
|---|---|---|---|---|
| 5,754,738 A | * | 5/1998 | Saucedo | G06F 30/00 706/26 |
| 5,876,550 A | * | 3/1999 | Feygin | B29C 41/36 264/405 |

(Continued)

FOREIGN PATENT DOCUMENTS

WO     2018075628 A1     4/2018

OTHER PUBLICATIONS

European Patent Office, International Search Report in corresponding International Application No. PCT/NL2020/050467 dated Aug. 17, 2020 (3 pages).

(Continued)

*Primary Examiner* — Jason Lin
(74) *Attorney, Agent, or Firm* — Leydig, Voit & Mayer, Ltd.

(57) ABSTRACT

A control system unit for a 3-dimensional (3D) object manufacturing system is disclosed herein that comprises one or more sensors and a controller. The one or more sensors are to sense 3D-objects manufactured in the manufacturing system in accordance with product specification data and to generate sensor signals representative for the sensed 3D-objects. The controller is to determine 3D-object characteristics of said sensed 3D-objects on the basis of said sensor data signals and to issue one or more corresponding control signals to control a system actuator unit so as to act on said sensed 3D-objects in accordance with their respective determined characteristics. The controller comprises a synthetic (Continued)

sensor data module to generate synthetic sensor data from product specification data of 3D-objects to be manufactured with the object manufacturing system, to therewith simulate sensor data for said 3D-objects to be sensed when manufactured. The controller further comprises a trainable classification module to be trained in a supervised manner with the synthetic sensor data. Therewith human assisted configuration efforts are obviated in that the improved control system unit does not require other input than the product specification data that was already available for the purpose of actually manufacturing the 3D-products to be identified.

5 Claims, 13 Drawing Sheets

(56) References Cited

U.S. PATENT DOCUMENTS

| | | | | |
|---|---|---|---|---|
| 6,122,564 | A * | 9/2000 | Koch | B23K 26/32 |
| | | | | 700/123 |
| 6,937,921 | B1 * | 8/2005 | Mazumder | B23K 26/34 |
| | | | | 700/182 |
| 7,023,411 | B2 * | 4/2006 | Fujii | G01G 23/36 |
| | | | | 345/88 |
| 10,444,735 | B2 * | 10/2019 | Natori | H04L 67/34 |
| 10,452,055 | B2 * | 10/2019 | Morovic | G05B 19/4099 |
| 10,744,598 | B2 * | 8/2020 | Hall | B23K 26/034 |
| 11,348,313 | B2 * | 5/2022 | Roca Vila | G06T 17/20 |
| 2002/0103555 | A1 * | 8/2002 | Wallace, Jr. | G06F 17/10 |
| | | | | 700/95 |
| 2006/0155418 | A1 * | 7/2006 | Bradbury | G05B 19/4099 |
| | | | | 700/182 |
| 2007/0273896 | A1 * | 11/2007 | Yamamura | H04N 1/4413 |
| | | | | 358/1.1 |
| 2009/0012640 | A1 * | 1/2009 | Wu | B33Y 50/02 |
| | | | | 700/98 |
| 2011/0002531 | A1 | 1/2011 | Heisele et al. | |
| 2012/0105534 | A1 * | 5/2012 | Boday | B33Y 30/00 |
| | | | | 347/20 |
| 2012/0105903 | A1 * | 5/2012 | Pettis | B33Y 50/00 |
| | | | | 358/1.14 |
| 2013/0157013 | A1 * | 6/2013 | Huson | B28B 1/001 |
| | | | | 501/141 |
| 2013/0171431 | A1 * | 7/2013 | Swartz | B29C 64/141 |
| | | | | 156/499 |
| 2013/0230832 | A1 * | 9/2013 | Peters | G09B 5/02 |
| | | | | 434/234 |
| 2013/0297059 | A1 * | 11/2013 | Grifith | B29C 64/386 |
| | | | | 700/98 |
| 2013/0321415 | A1 * | 12/2013 | Itabayashi | G06F 30/17 |
| | | | | 345/420 |
| 2015/0042755 | A1 * | 2/2015 | Wang | B29C 64/386 |
| | | | | 348/46 |
| 2015/0066178 | A1 * | 3/2015 | Stava | B22F 10/47 |
| | | | | 700/98 |
| 2015/0079327 | A1 * | 3/2015 | Kautz | B33Y 50/02 |
| | | | | 428/80 |
| 2017/0032281 | A1 | 2/2017 | Hsu | |
| 2018/0104898 | A1 | 4/2018 | Lameris et al. | |
| 2018/0126547 | A1 | 5/2018 | Corkum et al. | |
| 2018/0133969 | A1 * | 5/2018 | Huang | B29C 64/171 |
| 2018/0341248 | A1 | 11/2018 | Mehr et al. | |
| 2020/0047413 | A1 * | 2/2020 | Braunroth | B23D 59/001 |

OTHER PUBLICATIONS

Sushmit Chowdhury et al., "Artificial Neural Network Based Geometric Compensation for Thermal Deformation in Additive Manufacturing Processes," vol. 3, Proceedings of the ASME 2016 International Manufacturing Science and Engineering Conference, MSEC 2016, Jun. 27-Jul. 1, 2016, Blacksburg, Virginia, USA, XP055384459 (11 pages).

Xinbo Qi et al., "Applying Neural-Network-Based Machine Learning to Additive Manufacturing: Current Applications, Challenges, and Future Perspectives," Engineering, vol. 5, No. 4, pp. 721-729, Jul. 3, 2019, XP002796699.

European Patent Office, Office Action in European Patent Application No. 20743375.6 dated Aug. 13, 2024 (7 pages).

Xingchao Peng et al., "Learning Deep Object Detectors from 3D Models," 2015 IEEE International Conference on Computer Vision, pp. 1278-1286.

* cited by examiner

FIG. 2. CSU

FIG. 3. SU

FIG. 6. SSU

FIG. 7. PPG

FIG. 10. SIC

FIG. 11. MIC

CONTROL SYSTEM UNIT FOR USE IN A 3-DIMENSIONAL OBJECT MANUFACTURING SYSTEM AND A CORRESPONDING METHOD OF OPERATING

CROSS-REFERENCE TO RELATED APPLICATIONS

This patent application is a U.S. National Phase of PCT International Application No. PCT/NL2020/050467, filed Jul. 16, 2020, which claims priority to European Application No. 19186835.5, filed Jul. 17, 2019, which are both expressly incorporated by reference in their entireties, including any references contained therein.

FIELD

The present application relates to a control system unit for use in a 3-dimensional object manufacturing system.

The present application further relates to a 3-dimensional object manufacturing system provided with the control system unit.

The present application still further relates to a method of operating a controller used in the control system unit.

BACKGROUND

The invention described relates to any industry in which physical three dimensional (3D) objects are produced by manual, mechanical, chemical and/or organic means that have a digital 3D object representation that can serve as a quality assurance reference and/or as an identification and/or classification reference. These industries include but are not limited to any manufacturing industry that uses Additive Manufacturing (AM) techniques in which a digital 3D object is re-represented as an instruction set for a fully automated production process, any manual manufacturing industry using manual labour that uses the digital 3D object representation as a reference template for Quality Assurance (QA), any hybrid manufacturing industry that uses a combination of these production processes, and any manufacturing industry where objects are assembled either automated or by manual labour where the intermediate assembly needs to be compared during the assembly process to a digital 3D reference object for QA purposes and any agricultural or organic industry where a large quantity of produce such as seeds needs to be assured of quality using a digital 3D representation of the produce as a QA reference.

Exemplary quality evaluations may involve
weight verification;
breakage identification, localization and/or quantification;
print layer height verification;
color verification by spectral analysis;
warping (model deformation) detection and quantification;
part (region) measurement (e.g. verification of size of bore holes);
object symmetries recognition (e.g. is the object planar or radially symmetrical);
material appearance verification In modern production processes it is often a requirement that products can be manufactured at high production rates and with a high versatility to optimally meet customer requirements. In such production processes, where there is a large number of different objects produced in a short amount of time, the so-called high-mix/high-volume production processes, sorting and quality assurance (QA) of the products are often bottlenecks in optimizing the efficiency of these production lines and frequently require human intervention. This slows down the process, introduces vulnerability to mistakes, increases manufacturing costs and inhibits the evolution into fully automated and localized production plants, most notably in the AM industry. Our invention helps to remedy this bottleneck.

WO2018075628 discloses a manufacturing system unit for identifying printed objects that is intended to minimize the requirement of human intervention. The known manufacturing system unit includes an imaging device configured to image a three-dimensional (3D) printed object and a processor coupled to the imaging device. The processor is configured to receive information generated as a result of imaging the 3D printed object with the imaging device, to identify a set of features for the 3D printed object using the received information. The processor then compares the set of features with multiple reference sets of features, each of the multiple reference sets of features being associated with a respective 3D object in a plurality of 3D objects, and on the basis of the results of this comparison, it identifies the 3D object as one of said plurality of objects. To that end, the known system may generate for example a point cloud model of (a portion of) a 3D printed object to be identified and it may subsequently identify one or more features therein, such as a distance between a center point and another point in the point cloud model, a distance between two points in the point cloud model, an area of a triangle formed by three points in the point cloud model, a volume of a tetrahedron formed by four points in the point cloud model, and an angle formed by three points in the point cloud model.

Whereas this approach may reduce the requirement of human intervention during the manufacturing process, it is a disadvantage that it requires another human intervention to configure the system each time a new 3D object has to be manufactured. It requires that the operator of the system specifies in which respect such features are different from those of other new or known objects.

SUMMARY

It is an object of the present disclosure, to provide measures that at least mitigate the need of a human assisted configuration.

In accordance with this object, a control system unit for a 3-dimensional (3D) object manufacturing system is provided. The control system unit comprises one or more sensors and a controller. The one or more sensors are to sense 3D-objects that are manufactured in the manufacturing system in accordance with their product specification data, and are to generate sensor signals representative for the sensed 3D-objects. The controller is to determine 3D-object characteristics of said sensed 3D-objects on the basis of the sensor data signals and is configured to issue one or more corresponding control signals to control a system actuator unit so as to act on the sensed 3D-objects in accordance with their respective characteristics as determined by the controller.

Contrary to the known control system unit, the controller comprises a synthetic sensor data module and a trainable classification module. The synthetic sensor data module is to generate synthetic sensor data from product specification data of 3D-objects to be manufactured with the object manufacturing system, to therewith simulate sensor data for said 3D-objects to be sensed when manufactured and the trainable classification module is to be trained in a supervised manner with said synthetic sensor data. Human assisted configuration efforts are obviated in that the improved control system unit does not require other input than the product specification data that was already available for the purpose of actually manufacturing the 3D-products to be identified. The improved control system unit uses this product specification data to render the synthetic sensor data, i.e. sensor data that would closely resemble the sensor data obtained when sensing an object that is actually manufactured according to the product specification data. The synthetic sensor data is subsequently provided as training examples to the trainable classification module, so that subsequent to training, it can discriminate an object manufactured according to the product specification data from other objects. Therewith operator intervention can be mitigated, or even be completely obviated.

The trainable classification module may for example be a neural network, but may alternatively be another module, e.g. based on genetic algorithms, that can be trained by providing labeled examples.

In an embodiment the controller is configured to generate a feature vector representative for a synthetic sensor data instance, and store the same as a labeled data point in feature space, wherein the label indicates the object class. Therewith the labeled data is immediately available for reuse. Alternatively, the labeled data may be recomputed when necessary. The label of a labeled feature vector may further indicate one or more additional object features as represented in said synthetic sensor data instance. Examples thereof are an orientation of the object or a relative orientation between its parts, a print type (Selective Laser Sintering, Multi-Jet Fusion, etc.) or a production stage (printed, painted, polished, etc.)

In case that the one or more additional object features include an orientation of the object, these are preferably expressed as quaternion data. The feature data expressed in this way is always a differentiable function of the 3D-object. This strongly facilitates training of a neural network or other trainable model that uses this data.

Object features pertaining to an orientation of the object and/or a relative orientations between parts thereof, may further include an indication of a probability of occurrence of said orientation and/or said relative orientation. This can serve as an aid in classifying an object.

For more robustness, generating synthetic sensor data may comprise generating mutually different object specification data instantiations by varying one or more of an orientation, a morphologic characteristic and a surface feature characteristic. The controller can subsequently be trained with a plurality of pairs of mutually different synthetic sensor data instances having a same object classification. Therewith the control system unit is more robust when it is used in the manufacturing stage to identify objects as being of the same class, despite the fact that these may have minor variations due to tolerances in the manufacturing process.

For still more robustness, the controller may be trained with a plurality of pairs of mutually different synthetic sensor data instances having a different object classification.

Various types of sensor may be suitable for the purpose of obtaining sensor signals. Exemplary devices are laser scanners based on a Time Of Flight principle, laser scanners based on Infrared grid projection, RGB, or RGBD camera's.

Other examples are sonar sensors (e.g. a sonar scanline sensor), radar scanners, X-ray scanners and CT-scanners. In a typical example the sensor data signals comprise a sensor data signal from at least an image sensor. Synthetic sensor data may be obtained by generating a digital 3D-object representation (e.g. by ray-tracing) using the object specification data and subsequently generating the synthetic sensor data from the digital 3D-object representation using a computational model of said at least one image sensor. Likewise synthetic sensor data for other sensors can be obtained by simulating the response of the sensor to a digital representation of the object. It is noted that what is sensed is not necessarily human perceptible. It may further be contemplated to unify the first module that generates a digital representation of the 3D-object and the second module that generates the synthetic sensor data from the digital representation in a single unit. It may for example be contemplated to achieve this by training a neural network to provide the synthetic sensor data in response to the product specification data.

A 3-dimensional (3D) object manufacturing system provided with the improved control system unit may for example further comprise a specification receiving facility to receive the product specification data. The specification receiving facility may for example be a graphical user interface (GUI) where the operator provides the specifications of a 3D-object to be manufactured. Alternatively the product specification data may be read from a storage space, such as hard disk or may be retrieved via an internet connection. In again another case, the product specification data may be retrieved from an Enterprise Resource Planning (ERP) system that is part of a (semi) automated production environment.

One or more manufacturing system units may then manufacture 3D-objects in accordance with the product specification data. Manufacturing steps controlled by the product specification data may for example include 3D-printing, surface treatment, or coloring. For efficiency reasons one or more of such manufacturing steps may be applied for a set of mutually different objects. E.g. the 3D-printing step may print a collection of objects of mutually different types (classes) and deliver the products in random order because of the depowdering process inherent in Fused Deposition Manufacturing (FDM). In other examples a mixed stream of objects may originate from one of a manual assembly station, a dyeing unit, an additive manufacturing unit, a tumble polishing unit and an organic growth unit that deliver the products in random order.

In a later stage, objects of some classes may need different further treatment than those of another class. To that end the 3-dimensional (3D) object manufacturing system as disclosed herein further comprises an actuator system unit that receives the manufactured 3D-objects. The actuator system unit is controlled by the control signals of the control system unit so that it acts on the 3D-objects in accordance with their respective determined characteristics. The controlled actuator system unit may for example be an assembly unit that uses the control signal to select specific objects from the stream of objects that are to be assembled with other objects. In an other example, the controlled actuator system unit is a transport redirection unit that redirects objects in the stream of objects to a respective transport path in accordance with the control signal. In a still further example the controlled actuator system unit is a labeling unit that provides objects in the stream of mutually different objects with a label in accordance with the control signal. Also a controlled packaging unit may be contemplated that packages objects in the stream of mutually different objects in a respective package type in accordance with the control signal.

Once the control system unit has been trained, operation in a manufacturing system may proceed as follows.

In operation of the manufacturing system, the controller obtains sensor data signals for a 3D object handled by the 3D object production system, for example a 3D-object in a stream of different objects that originates from a manual assembly station, a dying unit, an additive manufacturing unit such as a 3D-print unit, a tumble polishing unit or an organic growth unit. The heterogeneous stream may for example be delivered to the control system unit via conveyor belt. The controller being trained using the product specification data classifies the 3D-object in the stream of objects on the basis of the sensor data signals. Based on the assigned classification the controller provides one or more control signals for controlling one or more production units, in particular actuation system units.

In an embodiment the controller may have a feature model that in response to the sensor data signals provides a feature vector signal representing a feature vector. Subsequently it may classify the object based on a comparison of the feature vector with stored labeled reference feature vector data and use a decision model to generate the control signal in accordance with said classification.

In an embodiment classification may take place in subsequent stages. A first stage may comprise a comparison of the feature vector with each of the plurality N of labeled reference feature vector data available for 3D-objects that could potentially be present, e.g. which are currently manufactured. A distance vector is then computed for each pair of the query feature vector computed for the sensor data and a respective one of said plurality of labeled reference feature vector data. The distance vector is indicative for a distance between the computed feature vector and the reference feature vector in that it each of its elements is indicative for a respective difference (e.g. absolute difference) between an element of the query feature vector and the reference feature vector. Subsequently, a classification score is computed from the distance vector, that indicates a likelihood that the query object is an object represented by the respective reference feature vector.

In a second stage a subset of r (r<N)) reference feature vectors having the highest classification scores may be selected from the N reference feature vectors. Therewith a set of r Reduced Reference Feature Vectors (RRFV[i]) are provided. Each of these reduced subsets RRFV[i] is obtained by excluding a respective one of said r reference feature vectors from the subset of r reference feature vectors. For example a first reduced subset RRFV[1] is obtained by excluding the first feature vector from the subset of r reference feature vectors, a second reduced subset RRFV[2] is obtained by excluding the second feature vector from the subset of r reference feature vectors, etc. Then a respective aggregated score is computed by a comparison of the query feature vector with the collection reference feature vectors in the each of the r reduced subsets RRFV[i]. The aggregated score provides a confidence indication in particular for those cases wherein according to the first stage two classifications would have approximately the same likelihood.

BRIEF DESCRIPTION OF THE DRAWINGS

Embodiments of the system and methods of the Control System Unit (CSU) are described in more detail in the following figures. Therein

DETAILED DESCRIPTION

The figures are not drawn to scale and its elements are labeled by capitalized acronyms indicating the various submodules of the system and method. labels L that are indexed by square brackets [i] indicate vectors (lists) and their size is made explicit in the description of the figure. Rectangles that are drawn with a dashed line indicate optional elements or elements that are part of a collection that may have a variable size. Rectangular elements with rounded corners are indicative of submodules that are further schematized in other figures and rectangles with square corners are not separately schematized but are instead described in the description of the figure in which they appear. Variable numbers and mathematical expressions are printed in bold and italic such as $\{i \in 1, \ldots, r\}$.

Figure 1:
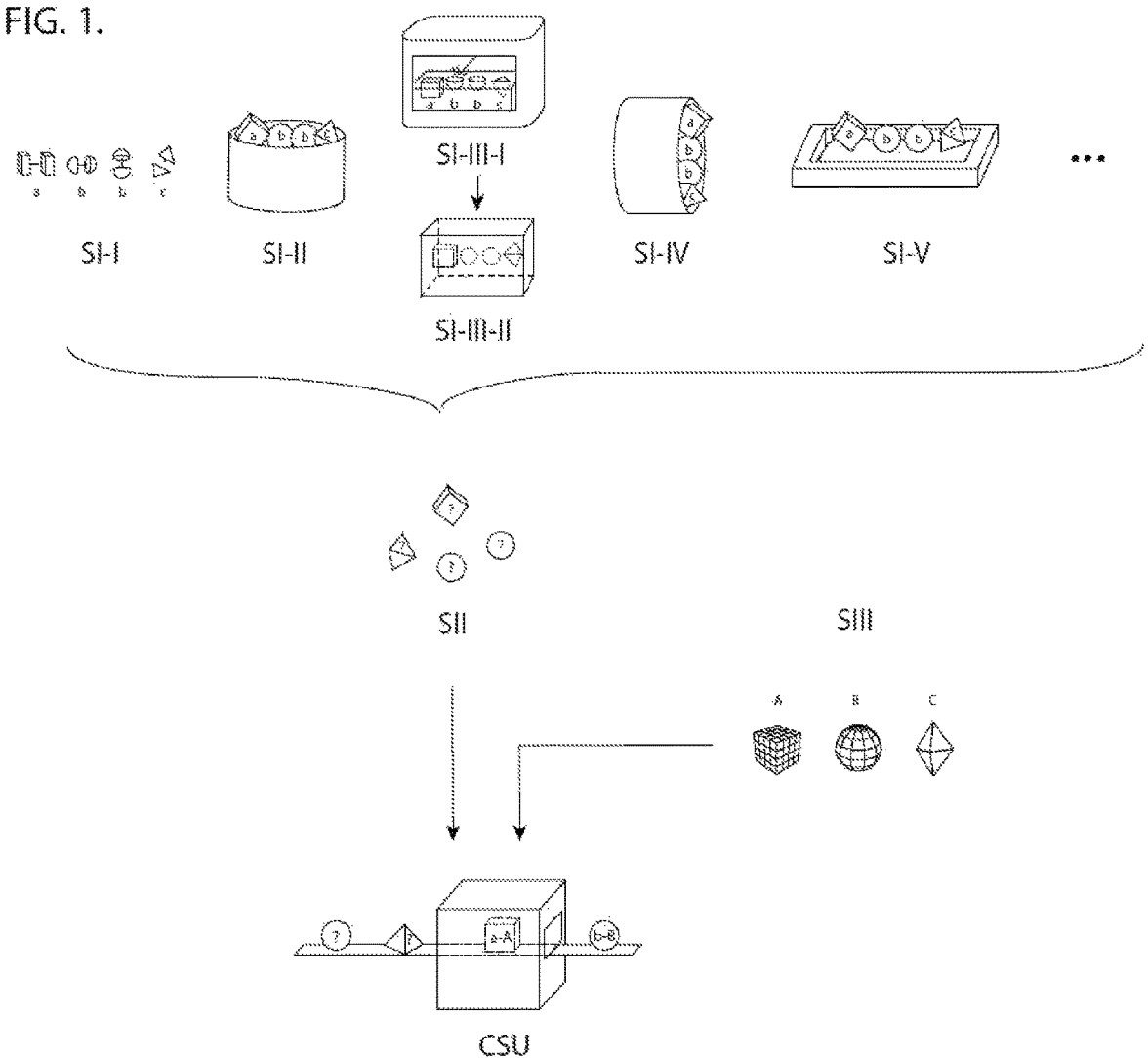
FIG. 1 shows typical fields of application for 3D object physical/digital correspondence measurement.

FIG. 1 shows typical fields of application for a control system unit for 3D object physical/digital correspondence measurement, further also denoted as 3D object physical/digital correspondence measurement or CSU. These fields are typically encountered in a 3-dimensional (3D) object manufacturing system. The a 3-dimensional (3D) object manufacturing system may comprise a specification receiving facility to receive product specification data for 3D-objects to be manufactured. The product specification data may for example be provided via a graphical user interface GUI, but may alternatively be retrieved from a storage space, e.g. a memory stick, or may be downloaded via an internet connection. The control system provided by the present inventors is trained by this already available product specification data. Examples where the CSU described in this application can be employed for this purpose may include, but are not limited to manual assembly (SI-I), suggesting that during assembly procedures, the intermediate or final assembly may be verified by comparing it with a 3D Object reference to ensure that the assembly is resulting in the correct intermediate or final object shape. SI-II and SI-IV depict the processes of dyeing and polishing different objects for which it may be necessary to be sorted further down the production line. If said objects are mixed during the process and no tags or other alterations may be made to the objects to indicate their identity, their identity may be inferred by the CSU herein described. It is common for 3D objects that are produced by means of Additive manufacturing or 3D printing processes (SI-III-I) to be printed in what is called a powder-tray in which up to thousands of individual objects are printed at the same time, and that subsequently need to be de-powdered (S-III-II) resulting in an unordered set of unlabeled objects. Also other manufacturing system units may deliver their products or semi-finished products in an unordered manner. The CSU herein described may then be used to identify each object from such manufacturing unit, e.g. the printing process. SII depicts the unordered and unidentified set of physical 3D objects that come from such high-mix high-volume production lines and SIII depicts the digital 3D object references provided by an operator or by an automated Enterprise Resource Planning (ERP) system that is part of a (semi) automated production environment.

Figure 2:
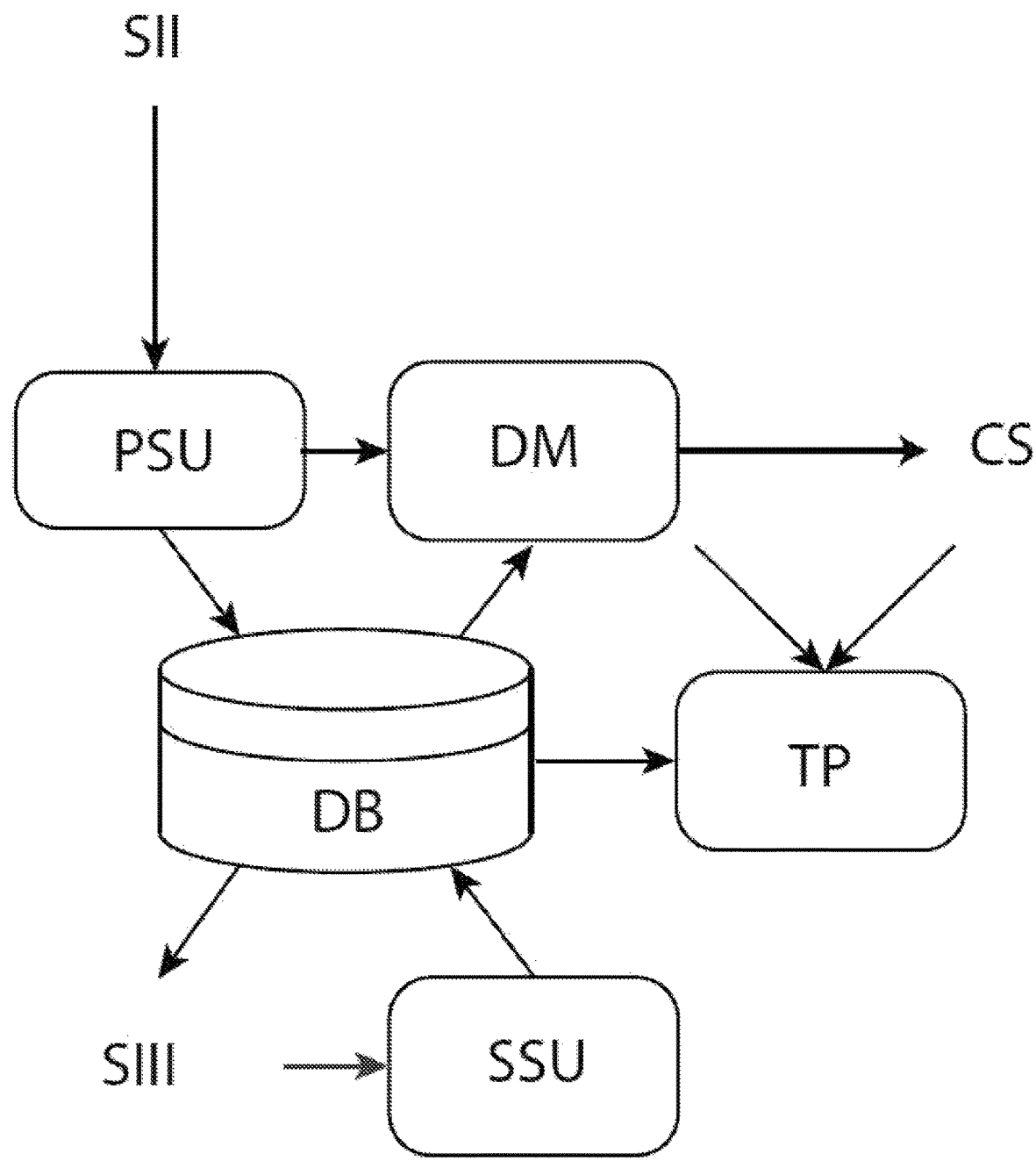
FIG. 2 shows an embodiment of the Control System Unit (CSU)

FIG. 2 shows an embodiment of the Control System Unit (CSU) as a combination of modules that are described in subsequent figures. Following the flowchart of the entire system from the top-left, an unordered set of physical 3D objects (SII, see FIG. 1) is placed on a transportation device such that a Physical Scanning Unit (PSU, see FIG. 5) receives them one-by-one. The PSU comprises one or more sensors that produce one or more sensor signals representing a Sensor Data Vector (SDV, see FIG. 4) that is stored in a database (DB) and provided to a Decision Module (DM, see FIG. 9). The Decision Module DM is a controller that determines 3D-object characteristics of the 3D-objects on the basis of the sensor data signals and issues one or more corresponding control signals CS to control a system actuator unit so as to act on the sensed 3D-objects in accordance with their respective determined characteristics in a connected automated production environment. As part of a (semi)automated production environment in which the CSU is embedded, an Enterprise Resource Planning (ERP) system provides a set of digital 3D Object representations (SIII, see FIG. 1) that are passed to the Simulated Scanning Unit (SSU, see FIG. 6). The SSU is configured to numerically emulate the PSU. Therewith the SSU functions as a synthetic sensor data module to generate synthetic sensor data from product specification data of 3D-objects to be manufactured with the object manufacturing system. The synthetic sensor data can be used as training data to be applied in Training Procedure (TP, see also FIG. 12) with which the Control System Unit (CSU) is trained to recognize the 3D-objects to be manufactured with the object manufacturing system.

Figure 3:
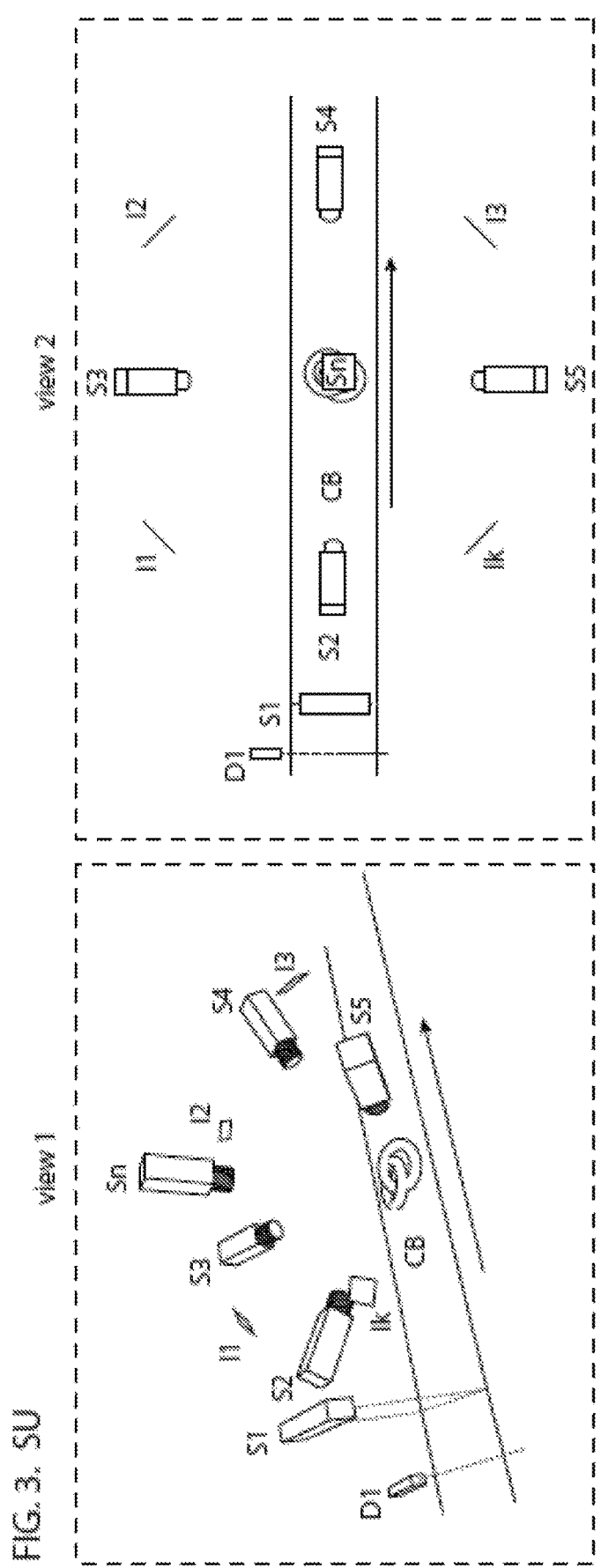
FIG. 3 shows an embodiment of the Scan Unit (SU) that captures Sensor Data (SD) either simulated, in silico or real, in vivo.

FIG. 3 shows a perspective view (view 1), and a top view (view 2) of an embodiment of the Scan Unit (SU) that is to generate sensor signals SD representative for the sensed 3D-objects. The SU represents a controlled environment in which a collection of sensors (S 1 through S n) records data on a 3D object. In the embodiment shown, the Scan Unit as shown is a Physical Scanning Unit, i.e. the real, in vivo implementation, with which the sensor signals are generated of manufactured 3D-objects conveyed by conveyor belt CB. Alternatively, the instantiation of the SU can be in simulation, in silico, in order to generate the synthetic sensor data for training. In either case, in some embodiments, a recording is made a time t after a detector D1 detects an object coming into the SU via a transportation device such as a conveyor belt by means of an optical switch but in other embodiments any other object detection mechanism may be used. A processor connected to D1 for controlling the acquisition of the data from S 1 through S n determines the time t based on the distance of D1 to each sensor. Alternatively, the acquisition may be initiated by a sensor in the collection of sensors. In an embodiment that initiating sensor is permanently monitored and upon detecting with that sensor that an object arrives, a timer is started that initiates data acquisition when the object is in a proper position. The initiating sensor is for example a camera, e.g. a top-camera of which the camera output is permanently scanned for object-detection. Object detection may be performed with a relatively low processing power, as at that stage the identity or class of the object need not be determined yet. Subsequent to detection of an object with the camera, the object is scanned in full detail when it has the proper position. Color-calibrated Light sources L 1 through L k are in the same way controlled by the processor and are activated at the time that each sensor requires. In some embodiments, the light sources may be controlled in a more elaborate manner, offering the possibility of generating more data by alternating light sources for each sensor. For instance, each sensor may take k recordings, where each light source 1, . . . , k is turned on and the others are turned off for each recording. In other embodiments other combinations of light sources can be employed to obtain yet more sensor signals SD. In one embodiment, four image sensors are positioned so that their receptive field captures the same area on the transportation device and are placed at the same height relative to the it, the mutual angles of the line of sight for each image sensor being 90 degrees so that the front, back, left and right side of an object can be captured, with an additional image sensor viewing from a 90 degree angle from the horizontal plane recording the top view of the object but in other embodiments any combination of image- or other sensors can be employed, placed at any useful position and angle in the Scan Unit SU.

Figure 4:
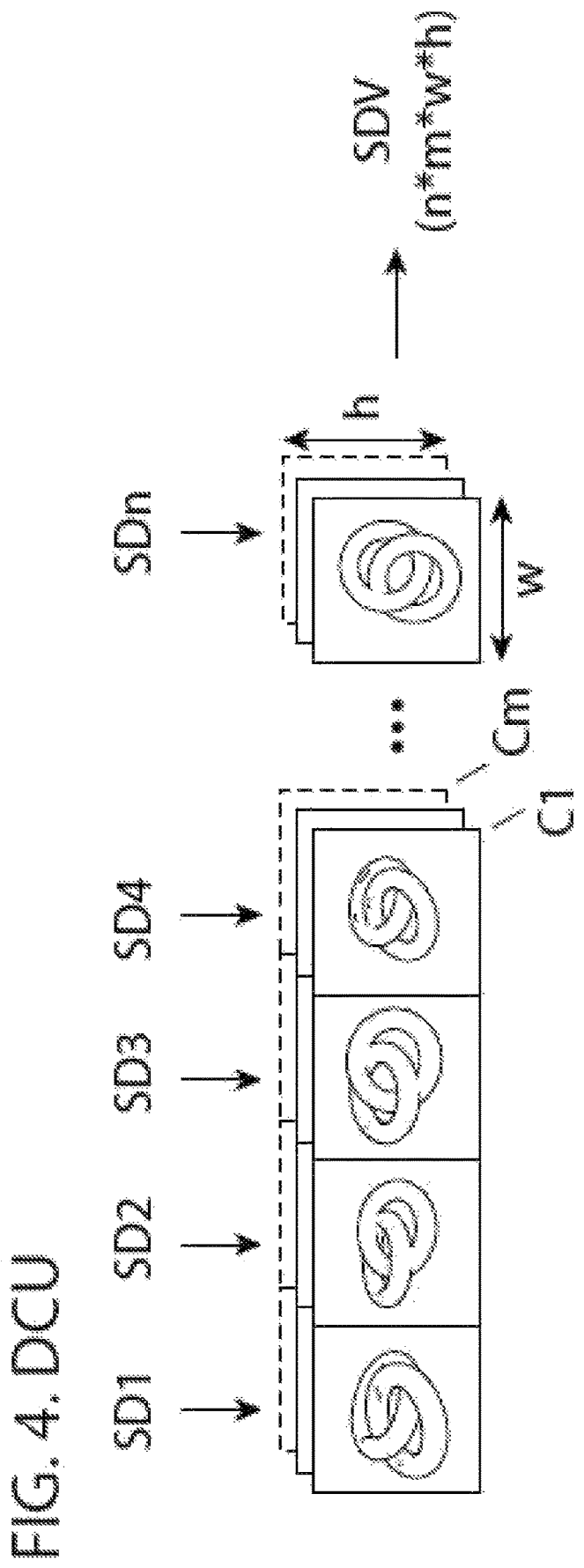
FIG. 4 shows an embodiment of the Data Collection Unit (DCU) that combines the Sensor Data (SD) into a single vector. (SDV)

FIG. 4 shows an embodiment of the Data Collection Unit (DCU) that combines a set of n digital Sensor Data (SD) into a single Sensor Data Vector (SDV). In one embodiment the SD contains information from an image sensor such as a common RGB camera but in other embodiments the SD may contain information from a depth sensor such as a laser scanner based on a time-of-flight method, a kinect sensor based on IR grid projection, a structured light projection and image sensing method, a sonic scanner such as a sonar device, an x-ray scanner, a CAT scanning device, and in further embodiments the SD may contain information from combinations of these methods. The SD from each source S1 through Sn may be pre-processed, e.g. by extra- or interpolation and formatting, so that it matches the output requirement set by w, h and m hyperparameters that are typically used for alignment of the output data in order to apply transfer learning techniques an/or used for optimization of the training efficiency. In embodiments, these hyperparameters may be learned by an extra auto-encoder neural network. Therewith a shared output format may be used, such as a representation in a 2D image. Sensor data from each Sensor S1 . . . Sn may be zero-padded or otherwise re-formatted so as to conform to the general output format of m channels. For example distance data from a sonar can be converted into a so-called heat-map by consistently mapping each distance value to a color using a monotonic function. The DCU combines this information into one list of values, so as to facilitate further processing of the information by the Control System Unit (CSU).

Figure 5:
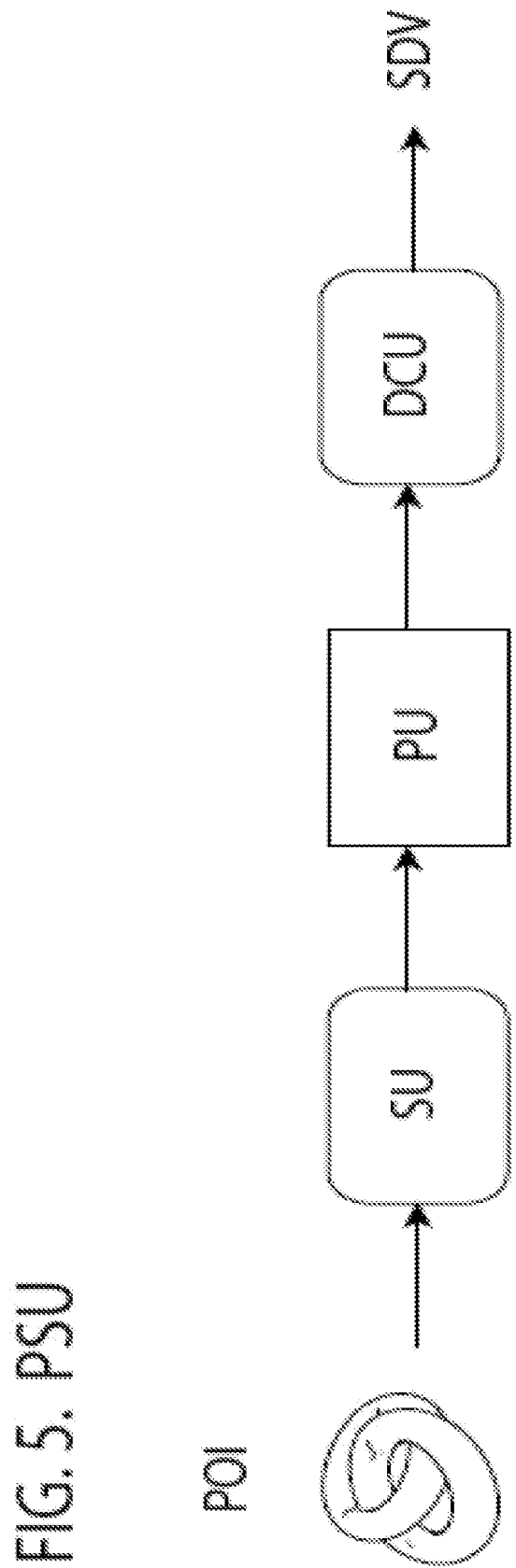
FIG. 5 shows an embodiment of the Physical Scan Unit (PSU)
Figure 6:
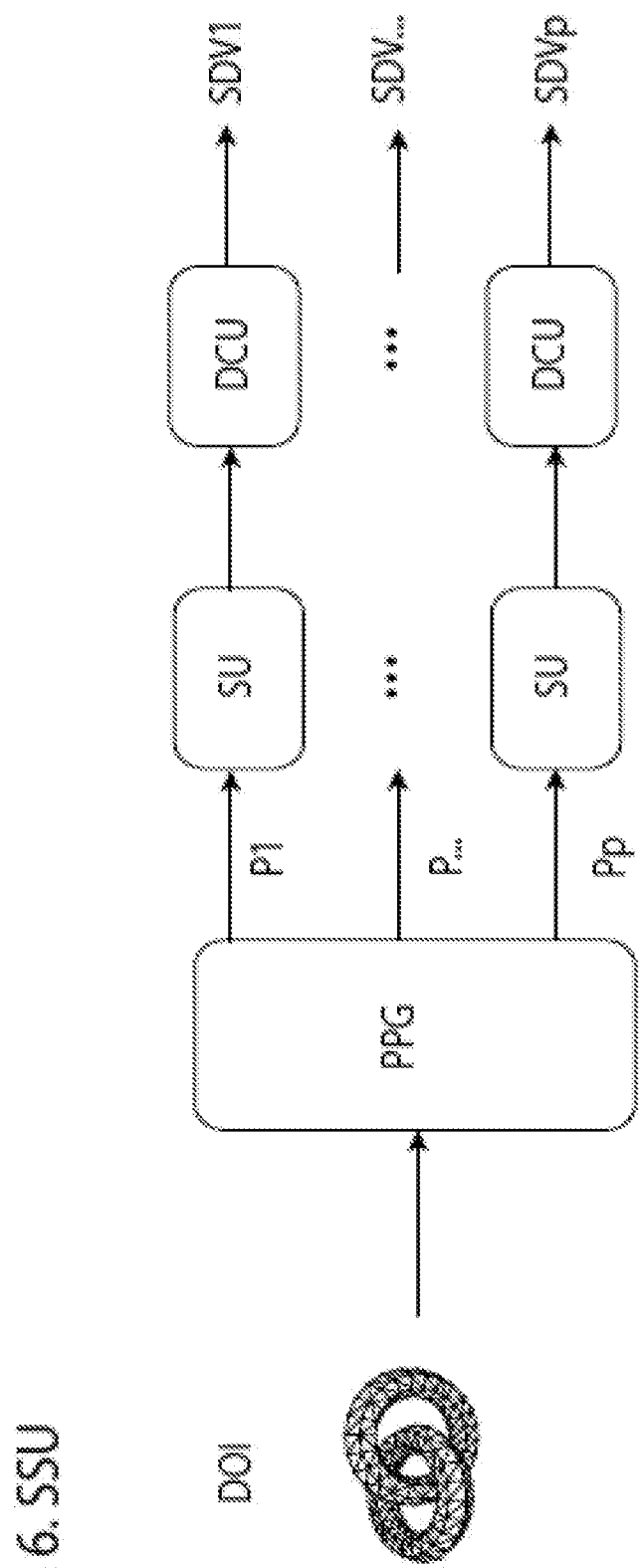
FIG. 6 shows an embodiment of the Simulated Scan Unit (SSU)

FIG. 5 shows an embodiment of the Physical Scan Unit (PSU) that generates Sensor Data (SD) for any given Physical 3D object input (POI) by means of a physical implementation of the Scan Unit (SU) described in FIG. 3 where the electronic (i.e. physical) output SD of the SU is passed to a Processing Unit (PU) that converts said electronic SD into digital format compatible with the digital SD output of the Simulated Scan Unit (SSU) described in FIG. 6. The digital SD from the PU is then passed to the Data Collection Unit (DCU) which outputs a Sensor data Vector (SDV) that can be further processed by the Control System Unit (CSU).

FIG. 6 shows an embodiment of the Simulated Scan Unit (SSU) that generates digital Sensor Data Vectors (SDV) for any given Digital 3D object input (DOI) by first passing the DOI to the Probable Poses Generator (PPG) and obtaining a set of the n most likely physically viable poses for the DOI which can then be passed to a numerically emulated Scan Unit (SU) shown in, and described with reference to FIG. 3. The SDs thus produced are then fed to Data Collection Units (DCU) to obtain n SDVs.

Figure 7:
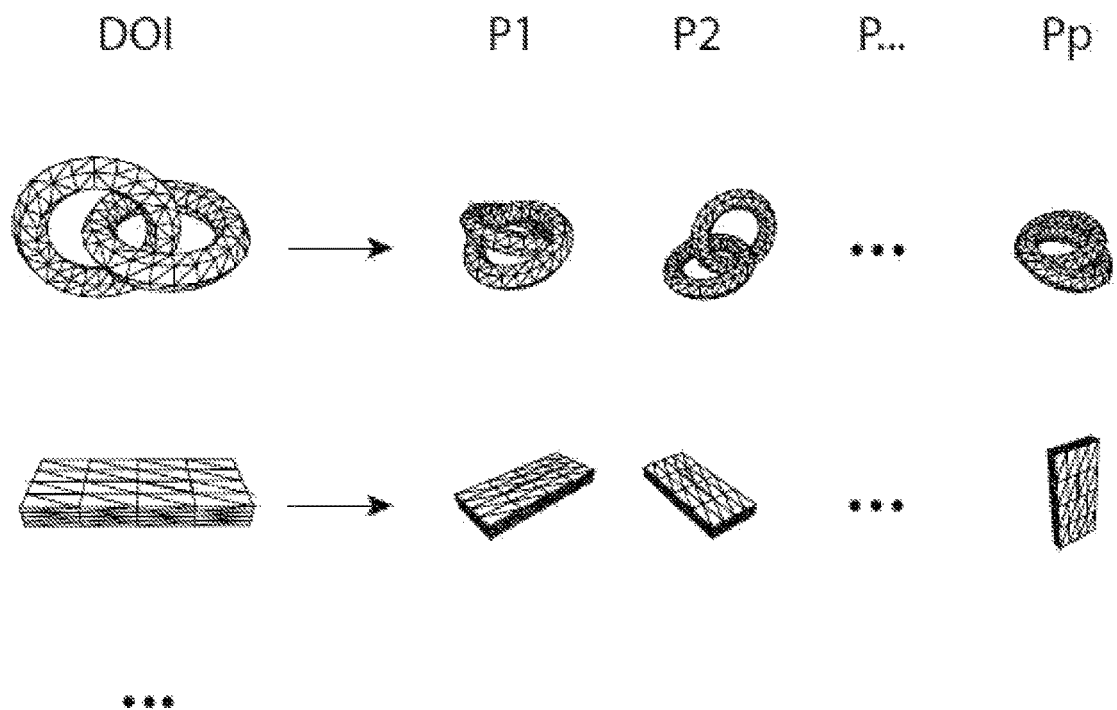
FIG. 7 shows an embodiment of Probable Poses Generator (PPG) that generates the most probable gravitationally stable poses for any given digital 3D object.

FIG. 7 shows an embodiment of Probable Poses Generator (PPG) that generates the most probable gravitationally stable poses P1 . . . Pp for any given Digital 3D object input (DOI). In one embodiment the generator uses off-the-shelf physics simulator software to evaluate what the most likely orientation of the object and the orientations of the object's subparts if present is once it has been placed on the conveyor belt using parameters that correspond to the objects' likely physical appearance such as friction, density, mass distribution and other physical parameters that may contribute to the accuracy of the simulation depending on the software being used. In other embodiments custom software may be used that performs such physical simulation using for example a featherstone multibody algorithm so that physically plausible orientations and configurations of the subparts are obtained. In further embodiments the flexibility of the object and of its subparts can be simulated using soft-body simulation using for example but not limited to the Bullet software library. In such embodiments in which physics simulator software is used to perform step-by-step analyses of the evolving orientation and deformations of the object and of its subparts from an initially random position above a simulated conveyor belt the most likely gravitationally stable orientations of the body and of its subparts are those that are recorded once the simulation has run for an extensive period of time and the object and its subparts are no longer moving to within a reasonably low tolerance. In embodiments where the numerical analysis is performed statically, that is, based solely on the geometry of the digital object the most likely orientations of the object and of its subparts are those that are evaluated as such by the software. The output of the generator is a set of digital 3D object files each containing the full assembly of the object and of its subparts in the orientations as recorded by the physics simulation software and/or the orientations calculated by the static analysis software.

Figure 8:
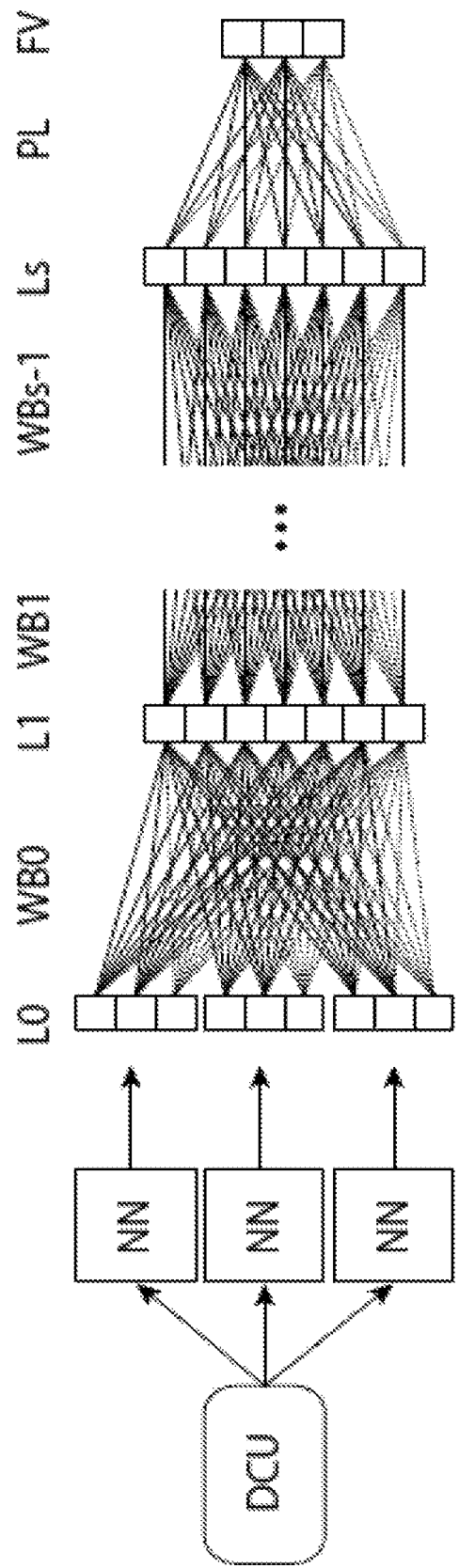
FIG. 8 shows in more detail an embodiment of the Feature Module (FM) that performs dimension reduction on the Sensor Data (SD)

FIG. 8 shows an embodiment of the Feature Module (FM) that performs dimension reduction on the Sensor Data Vector (SDV). In one embodiment the FM has the same architecture as the ResNet50[1] Neural Network (NN) with an additional fully connected layer, a batch normalization layer and a new feature vector layer with the size of 1024 but in other embodiments there can be any number of extra layers of any type and varying length with or without associated weights and biases attached to the NN. In one embodiment the size of the SDV matches the size of the input layers of the NN so that precisely an integral number of FVs can be generated from the SDV but in other embodiments an additional neural network with an arbitrary number of layers of arbitrary type and length with associated weights and biases can be attached to the SDV in order to accommodate said requirement. In one embodiment the FVs are then propagated forward to a pooling layer to produce a final FV of a particular size but in other embodiments the FVs are propagated to subsequent layers L 0 through L s of arbitrary type and length with associated weights and biases WB 0 through WB s−1 with a pooling layer attached to L s to produce the final FV of a particular size.

Figure 9:
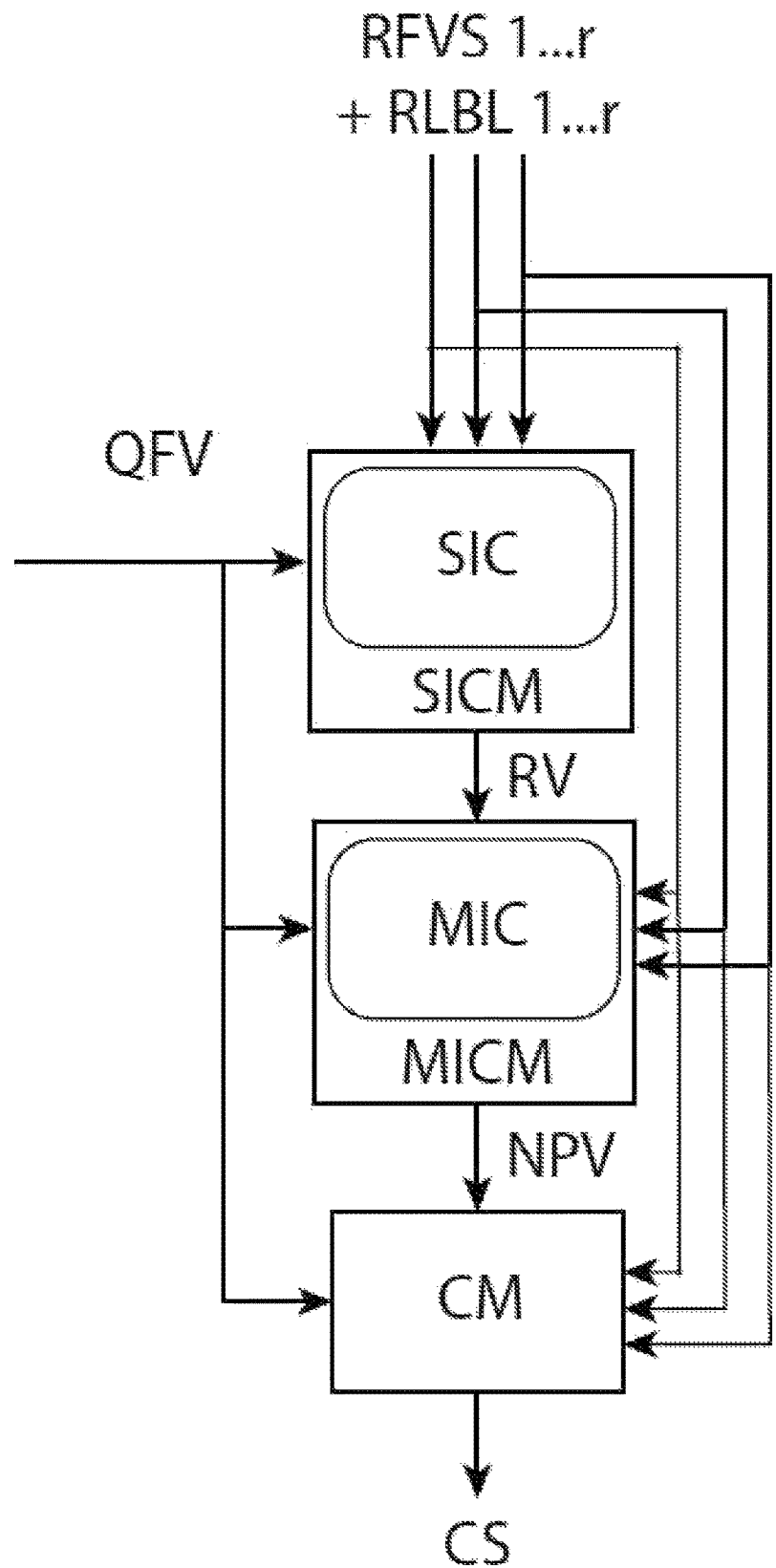
FIG. 9 shows in more detail an embodiment of the Decision Module (DM)

FIG. 9 shows an embodiment of the Decision Module DM that takes as input one query feature vector (QFV) for which a Control Signal (CS) is to be obtained from the Control Module (CM) based on the identification of the QFV with one of a set of r Reference Feature Vectors (RFVS1 . . . r) and corresponding set of r reference labels (RLBL1 . . . r) obtained from synthetic renderings from the Simulated Scan Unit (SSU). In one embodiment the RFVs are obtained from a database (DB, see e.g. FIG. 2) that was prepared by an operator storing the set of RFVs of the Digital 3D Objects of which corresponding physical 3D Objects are expected to be scanned but in other embodiments the set of RFVs of the Digital 3D Objects can be provided by an Enterprise Resource Planning (ERP) system as part of the automated production workflow. The correspondence measurement of the QFV with each of the r RFVS is performed in two classification stages, first the Single Instance Classifier Module (SICM) produces a Ranking Vector (RV) that is constructed by applying the Single Instance Classifier (SIC— see FIG. 11) to each pair of QFV, RFV[i], $\{i \in 1, \ldots, r\}$ and storing the resulting correspondence measures in a list RV which is ordered in descending order and truncated to length s<r which is a hyperparameter and is empirically chosen as s=0.1*r. The RV is then passed to the Multi Instance Classifier Module (MICM) that produces a list of Normalized Probability Values (NPV) representing the correspondence of each label in the RV with the QFV. The SIC typically only measures the correspondence between pairs of FVs. The MICM is specifically trained to improve the confidence level of the CSU, i.e. it provides an indication of confidence of those measurements with respect to the other elements of the set of r RFVS. Finally, the NPV is passed to the Control Module (CM) that produces one or more final Control Signals (CS) for control of the automated production facility. In some embodiments the CM simply passes along the given NPV, but in other embodiments the CM can produce a weighted NPV based on further combination of the RFVS, RLBL, QFV, RV and/or the NPV.

Figure 10:
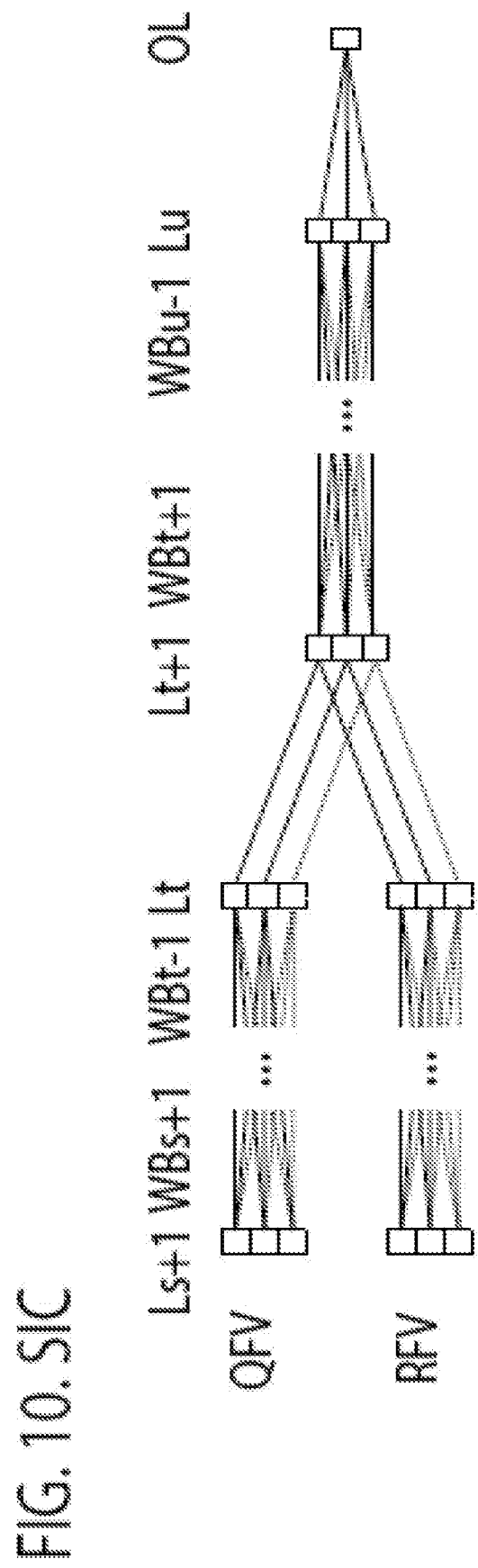
FIG. 10 shows in more detail an embodiment of the Single Instance Classifier (SIC) previously seen in FIG. 9.

FIG. 10 shows in more detail an embodiment of the Single Instance Classifier (SIC) previously seen in FIG. 9 that produces the correspondence measure of a Query Feature Vector (QFV) each time with one Reference Feature Vector (RFV) of the set of r Reference Feature Vectors (RFVS1 . . . r). The SIC is a part of the neural network that is described by the CSU and can be considered as a 'Siamese Neural Network' because it converges two branches of computational neural network layers and weights into one main branch. The first branch takes as its input Layer L s+1 the output of the Feature Model (FM—see FIG. 9) or a stored copy thereof which represents the QFV and is of identical length. The second branch takes as input the output of the FM or a stored copy thereof which represents the RFV and is of identical length. In one embodiment the subsequent layers L s+2 through L t are fully connected layers with length (number of neurons per layer) smaller than the length of L s+1 with associated weights and biases WB s+1 through WB t−1 but in other embodiments, the subsequent layers L s+2 through L t may be implemented as any number of layers of other types and varying lengths with or without associated weights and biases. The layer L t+1 is the distance measure layer which in one embodiment may be implemented as a L1 regularization layer of the same length as L s+2 without associated weights or biases but in other embodiments may be implemented as any number of layers of other types and varying lengths with or without associated weights and biases. In one embodiment the subsequent layers L t+2 through L u are fully connected layers of the same length as L s+2 with associated weights and biases WB t+2 through WB u−1 but in other embodiments the subsequent layers L t+2 through L u may be implemented as any number of layers of other types and varying lengths with or without associated weights and biases. In one embodiment the Output Layer (OL) may be implemented as a sigmoid layer with a single neuron that is fully connected to the first-to-last layer L u without associated weights and biases but in other embodiments OL may be implemented as a layer of any other type and varying length with or without associated weights and biases.

Figure 11:
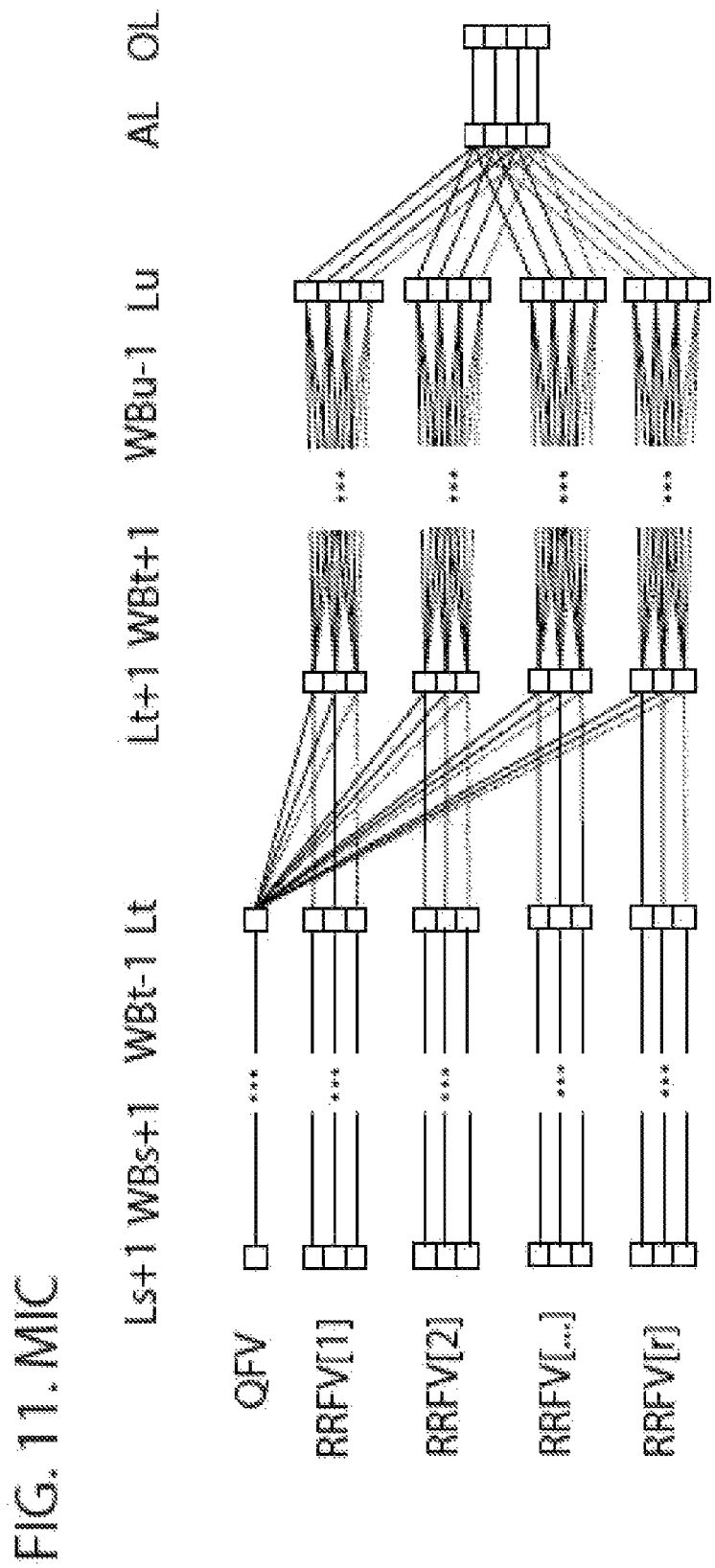
FIG. 11 shows in more detail an embodiment of the Multi Instance Classifier (MIC) previously seen in FIG. 9.

FIG. 11 shows in more detail an embodiment of the Multi Instance Classifier (MIC) previously seen in FIG. 9 that produces the correspondence measures of a Query Feature Vector (QFV) with each of a set of r Reduced Reference Feature Vectors (RRFV) that is prepared in the encapsulating Multi Instance Classifier Module (MICM). The MIC is a part of the neural network that is described by the CSU and first branch of the network takes as its input Layer L s+1 the output of the Feature Model (FM—see FIG. 8) or a stored copy thereof which represents the QFV and is of identical length. In one embodiment there are r*(r−1) subsequent branches that can be indexed as b[i][j] {i∈1, . . . , r} {j∈1, . . . , r−1} where the input to each set of branches b[i] is the set of RFVs where the [j]'th element of the set is the RFV associated by the [j]'th label of the Rank Vector (RV) provided by the SICM minus the i'th RFV. For example, let the set of RFVS=[1,2,3,4,5,6,7,8,9] and let the Rank Vector RV=[9,2,4,1] then the RRFV=[[2,4,1], [9,4,1], [9,2,1], [9,2,4]]. In one embodiment the r*(r−1) input layers L s+1 are directly connected to an L1 regularization layer to which also the input layer L s+1 of the first branch is connected without associated weights or biases but in other embodiments the layers L s+1 through L t+1 may be implemented as any number of layers of other types and varying lengths with or without associated weights and biases. In one embodiment the r*(r−1) L1 regularization layers are connected to a set of subsequent layers L t+1 through L u of which the L u layer consists of r fully connected layers with softmax activation with weights and biases WB t+1 through WB u−1 but in other embodiments the layers L t+1 through L u may be implemented as any number of layers of other types and varying lengths with or without associated weights and biases. In one embodiment each element of the r softmax layers of L u is then averaged into each element of the AL layer of length r which is then normalized into the Output Layer OL but in other embodiments the r layers in L u may be connected to any number of layers of other types and varying lengths with or without associated weights and biases.

Figure 12:
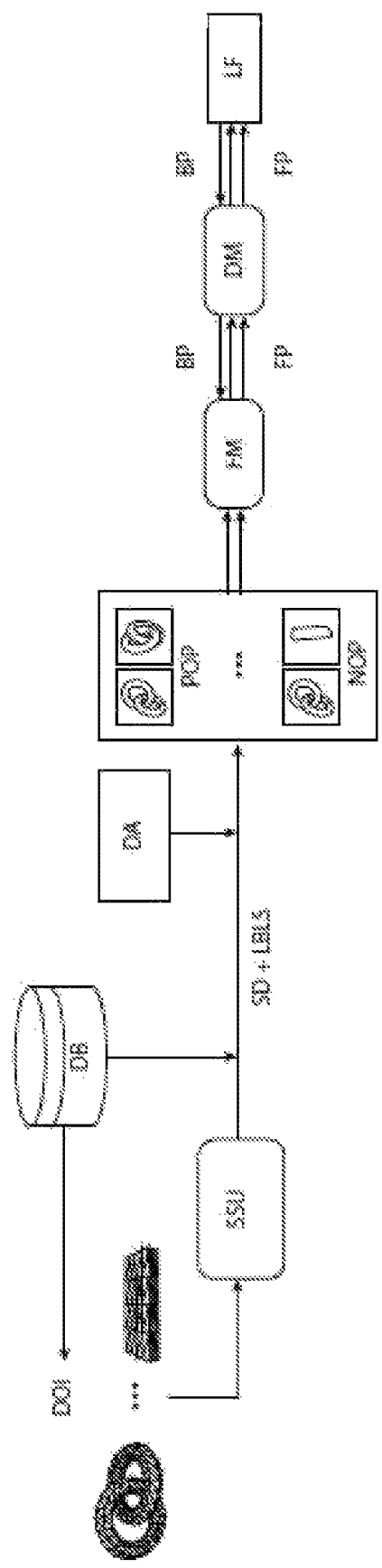
FIG. 12 shows in more detail an embodiment of the Training Procedure (TP) previously seen in FIG. 2.

FIG. 12 shows in more detail an embodiment of the Training Procedure (TP) previously seen in FIG. 2 that is employed to improve the accuracy and confidence of the CSU. The weights in the neural network for the Feature Model (FM) (as shown in FIG. 8) are initialized using ResNet50, and the weights for the Single Instance Classifier (SIC) described with reference to FIG. 10 and the Multi Instance Classifier (MIC) described with reference to FIG. 11 are initialized randomly. Two Sensor Data Vectors (SDV) that are obtained from the Simulated Scan Unit (SSU) and/or from the Database (DB) are Forward-Propagated (FP) through the FM to obtain a pair of FVs that represent either a Positive Object Pair (POP) when they are obtained from the same Digital or Physical Object Input (DOI, POI) or a Negative Object Pair (NOP) when they are from different DOI or POI. The Control Signal (CS) for a POP is expected to be 1.0 and the CS for a NOP is expected to be 0.0, for which in one embodiment cross-entropy may be used to define the Loss Function (LF) but in other embodiments any other LF may be used. In one embodiment the weights and biases of the DM and the FM are then adjusted using Back Propagation (BP) but in other embodiments other techniques may be employed to minimize the loss.

Figure 13:
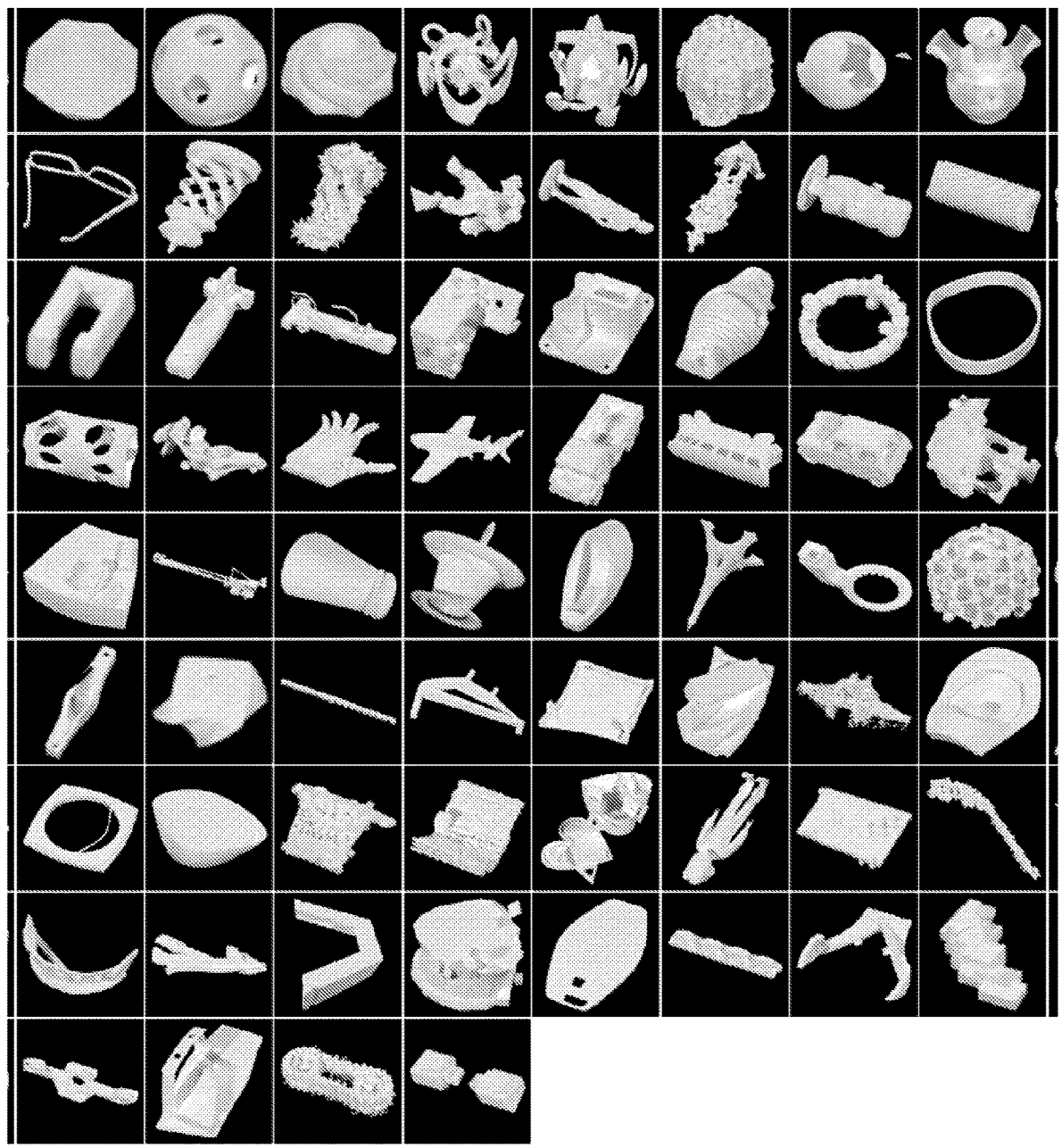
FIG. 13 shows an exemplary set of 68 objects that was designed for test purposes.

FIG. 13 shows 68 samples from a larger set of objects that was used for test purposes. The trainable classification module was trained with the synthetic sensor data obtained on the basis of the specification data for objects that are not in the test set, and are different in shape but similar in size, color and material appearance. Subsequent to this training the decision module measured the accuracy of the first entry indicated in the ranking provided by the single instance classifier module (SICM, FIG. 9) to be 99.17%. In any case the correct object was indicated in the top 3 of this ranking.

[1] Deep Residual Learning for Image Recognition
https://arxiv.org/abs/1512.03385

LEGENDA

FIG. 1.
SI-I manual assembly
a, b, c physical representations of 3D objects
SI-II dyeing
SI-III-I Additive Manufacturing
SI-III-II depowdering
SI-IV tumble polishing
SI-V organic growth
SII unordered set of physical 3D objects
SIII digital 3D Object representations
A, B, C digital representations of 3D objects
CSU Control System Unit
FIG. 2.
SII unordered physical 3D objects
DM Decision Module
PSU Physical Scan Unit
IM Inference Module
TP Training Procedure
CS Control Signal
SIII digital 3D Object representations
DB Database
SSU Simulated Scan Unit
FIG. 3.
View 1 depicts a perspective view on the system
View 2 depicts a top-down view on the system
D1 Detector 1
S1-Sn Sensor 1 . . . n
I1-Ln Illumination unit 1 . . . k
CB Conveyor Belt
FIG. 4.
SD1 . . . Sn Sensor Data 1 . . . n
w width of sensor image data
h height of sensor image data
C1 . . . Cm sensor Channel 1 . . . m
SD output Sensor Data SDV Sensor Data Vector
FIG. 5.
POI Physical 3D Object Input
SU Scan Unit
PU Processing Unit
DCU Data Collection Unit
SD Sensor Data
SDV Sensor Data Vector
FIG. 6.
DOI Digital 3D Object Input
PPG Probable Poses Generator
P1 . . . Pn Pose 1 . . . n
SU Scan Unit (virtualized)
DCU Data Collection Unit (virtualized)
SDV1 . . . SDVp Sensor Data Vector for each pose p
FIG. 7.
DOI Digital 3D Object Input
P1 . . . Pn generated Poses 1 . . . n
FIG. 8.
NN Neural Network (f.i. ResNet50)
L 0 . . . L s neural network computational Layers
WB 0 . . . WB s Weights and Biases
PL Pooling Layer
FV Feature Vector
FIG. 9.
RFV[i] Reference Feature Vectors {i∈1, . . . , r}
RLBL[i] Reference Labels {i∈1, . . . , r} for each reference FV
QFV Query Feature Vector
SIC Single Instance Classifier
SICM Single Instance Classifier Module
RV Rank vector
MIC Multi Instance Classifier
MICM Multi Instance Classifier Module
CM Control Module
CS Control Signal
NPV Normalized Probability Values
FIG. 10.
QFV Query Feature Vector
RFV Reference Feature Vector
L s+1 . . . L t computational layers
WB s+1 . . . WB t Weights and Biases
L t+1 . . . L u computational layers
WB t+1 . . . WB u Weights and Biases
OL Output Layer (f.i. sigmoid)
FIG. 11.
QFV Query Feature Vector
RRFV[i] set of r Reference Feature Vectors {i∈1, . . . , r} of length r−1 with RF[i] removed
L s+1 . . . L t computational layers
WB s+1 . . . WB t Weights and Biases
L t+1 . . . L u computational layers
WB t+1 . . . WB u Weights and Biases
OL Output Layer (f.i. softmax)
FIG. 12.
DOI Digital 3D Objects Input
SSU Simulated Scan Unit
DB Database
DA Data Augmentation
SD Sensor Data
LBLS Labels
POP Positive Object Pair
NOP Negative Object Pair
FM Feature Module
DM Decision Module
LF Loss Function
FP Forward Propagation
BP Back Propagation

The invention claimed is:

1. An operating method for a controller in a 3-dimensional (3D) object production system, the method comprising:
    obtaining sensor data signals for a 3D object handled by the 3D object production system;
    receiving, by the controller, the sensor data signals for the 3D object handled by the 3D object production system;
    classifying, by the controller based on the sensor data signals, the 3D object to a 3D object class of a set of 3D object classes; and
    providing, by the controller, a control signal to an actuator unit so as to act on the 3D object in accordance with the 3D object class;
    wherein the method further comprises performing a training procedure for each 3D object of a set of one or more 3D objects that at least comprise the 3D object handled by the 3D object production system,
    wherein the training procedure comprises, for each 3D object of the set of 3D objects, the following;
        receiving object specification data for each 3D object class to be manufactured;
        generating, for each 3D object class, synthetic sensor data that is expected to correspond to sensor data of 3D objects manufactured according to object specification data for each 3D object class of the set of 3D object classes; and
        training, for each 3D object using the synthetic sensor data and a 3D object class assignment from the set of 3D object classes, the controller in a supervised procedure;
    wherein the method comprises providing, by the controller in accordance with the sensor data signals, a feature vector signal representing a computed feature vector,
    wherein the classifying the 3D object comprises classifying the 3D object based on a comparison of the computed feature vector with stored labeled reference feature vector data, and
    wherein the classifying the 3D object comprises:
        comparing the feature vector with the stored labeled reference feature vector data to compute, for each pair of the feature vector and a respective one of a plurality of labeled reference feature vectors of the stored labeled reference feature vector data, a distance vector that is indicative of a distance between the computed feature vector and the respective one of the plurality of labeled reference feature vectors; and
        determining a classification score indicating a likelihood that the 3D object to be classified is an object represented by the respective reference feature vector.

2. The method according to claim 1, further comprising:
    selecting a subset of Reduced Reference Feature Vectors (RRFV) of r (r<N)) reference feature vectors having the highest classification scores from the plurality of labeled reference feature vectors;
    providing r reduced subsets RRFV [i], each reduced subset being obtained by excluding a respective one of the r reference feature vectors from the subset RRFV of r reference feature vectors;
    for each of the r reduced subsets RRFV [i] computing a respective aggregated score from the distance feature vectors computed for the pairs of the computed feature vector and the reference feature vectors in the each reduced subset.

3. A control system unit for a 3-dimensional (3D) object manufacturing system comprising:
one or more sensors configured to sense respective 3D objects manufactured in the manufacturing system in accordance with respective product specification data, to generate respective sensor data signals representative of sensed respective 3D objects; and
a controller configured with executable code that, when executed by the controller, facilitates carrying out a manufacturing system control method comprising:
determining 3D object characteristics of the sensed respective 3D objects on a basis of the respective sensor data signals, and
issuing, in accordance with respective determined 3D object characteristics, one or more corresponding control signals to control a system actuator unit so as to act on the sensed respective 3D objects;
wherein the controller is further configured to carry out the determining and issuing operations in accordance with a training procedure including:
generating respective synthetic sensor data from respective product specification data of respective 3D objects to be manufactured with the object manufacturing system, to simulate sensor data of the one or more sensors for the respective 3D-objects to be sensed; and
training the controller in a supervised manner with the respective synthetic sensor data,
wherein the manufacturing system control method carried out by the configured controller includes:
producing a ranking vector based on a comparison of a query feature vector obtained for an object with a plurality of reference feature vectors, and
producing a list of Normalized Probability Values representing the correspondence of each label in the ranking vector with the query feature vector.

4. The control system unit according to claim 3, wherein the Single Instance Classifier is configured to provide as the ranking vector a subset of r Reference Feature Vectors (RFV) of r (r<N)), the reference feature vectors in the subset having the highest classification scores from among the full set of N reference feature vectors; and
wherein the Multi Instance Classifier is configured to compute for each of r reduced subsets RRFV [i] a respective aggregated score from the distance feature vectors computed for the pairs of the computed feature vector and the reference feature vectors in the each reduced subset, wherein each reduced subset is obtained by excluding a respective one of the r reference feature vectors from the subset RRFV of r reference feature vectors.

5. The control system unit according to claim 3, wherein the one or more sensors comprise at least one image sensor.

* * * * *